US012763637B2

(12) United States Patent
Karjala

(10) Patent No.: US 12,763,637 B2
(45) Date of Patent: Oct. 13, 2026

(54) CABLE SHIELD TO MOTOR HOUSING TERMINATOR

(71) Applicant: BAKC CAPITAL GROUP, Suwanee, GA (US)

(72) Inventor: Bruce Karjala, Suwanee, GA (US)

(73) Assignee: BAKC CAPITAL GROUP, Suwanee, GA (US)

( * ) Notice: Subject to any disclaimer, the term of this patent is extended or adjusted under 35 U.S.C. 154(b) by 288 days.

(21) Appl. No.: 18/566,829

(22) PCT Filed: Jun. 2, 2022

(86) PCT No.: PCT/US2022/031950
§ 371 (c)(1),
(2) Date: Dec. 4, 2023

(87) PCT Pub. No.: WO2022/260926
PCT Pub. Date: Dec. 15, 2022

(65) Prior Publication Data

US 2024/0275234 A1 Aug. 15, 2024

Related U.S. Application Data

(60) Provisional application No. 63/208,550, filed on Jun. 9, 2021.

(51) Int. Cl.
*H02K 5/22* (2006.01)
*H01R 13/6592* (2011.01)

(52) U.S. Cl.
CPC ......... *H02K 5/225* (2013.01); *H01R 13/6592* (2013.01)

(58) Field of Classification Search
CPC ...................................................... H02K 5/225
See application file for complete search history.

(56) References Cited

U.S. PATENT DOCUMENTS

2001/0029120 A1 10/2001 Miyazaki et al.
2002/0043883 A1 * 4/2002 Shimizu ............... H01R 13/405 310/71

(Continued)

FOREIGN PATENT DOCUMENTS

CN 101335446 A * 12/2008 ............. H02K 5/225
CN 109104033 A * 12/2018 ............. H02K 5/225

(Continued)

OTHER PUBLICATIONS

18566829_2025-10-27_CN_101335446_A_H.pdf (Year: 2025).*

(Continued)

*Primary Examiner* — Christopher M Koehler
*Assistant Examiner* — Ahmed F Seck

(57) ABSTRACT

A terminator device is configured to electrically connect a shield of a shield cable connected to a motor drive to an electrically conductive motor housing of an electric motor. The terminator device includes: an electrically conductive housing; a shield connector configured to electrically connect (a) the shield of the shielded cable that is connected to the motor drive to (b) the electrically conductive housing; a housing conductor that is electrically conductive and that includes: a first end that is directly connected to the electrically conductive housing; and a second end configured to be directly connected to the electrically conductive motor housing of the electric motor.

20 Claims, 14 Drawing Sheets

(56) References Cited

U.S. PATENT DOCUMENTS

| | | | | |
|---|---|---|---|---|
| 2006/0066162 | A1* | 3/2006 | Woodson | H02K 5/225 310/71 |
| 2007/0210661 | A1* | 9/2007 | Schmidt | H02K 5/225 310/90 |
| 2013/0134807 | A1* | 5/2013 | Murata | E02F 9/0858 310/67 R |
| 2017/0149363 | A1* | 5/2017 | Schroedel | H02P 5/74 |
| 2018/0069385 | A1* | 3/2018 | Gause | H02G 3/083 |
| 2019/0036239 | A1* | 1/2019 | Mathews | H01B 11/1895 |
| 2020/0251855 | A1* | 8/2020 | Chen | H02K 5/225 |
| 2021/0098945 | A1* | 4/2021 | Karjala | H01R 13/6593 |

FOREIGN PATENT DOCUMENTS

| | | | | |
|---|---|---|---|---|
| KR | 1020150028966 | A | 3/2015 | |
| KR | 1020180047791 | A | 5/2018 | |
| WO | WO-2013178433 | A1 | 12/2013 | |
| WO | WO-2014118488 | A1 * | 8/2014 | H02K 5/225 |

OTHER PUBLICATIONS

18566829_2025-10-27_WO_2014118488_A1_H.pdf (Year: 2025).*
18566829_2026-08-09_CN_109104033_A_H.pdf (Year: 2026).*
International Search Report and Written Opinion of the ISA issued in PCT/US2022/031950, mailed Sep. 21, 2022; ISA/KR.

* cited by examiner

CABLE SHIELD TO MOTOR HOUSING TERMINATOR

CROSS-REFERENCE TO RELATED APPLICATIONS

This application is a U.S. National Phase Application under 35 U.S.C. 371 of International Application No. PCT/US2022/031950, filed on Jun. 2, 2022, which claims the benefit of U.S. Provisional Application No. 63/208,550, filed on Jun. 9, 2021. The entire disclosures of the applications referenced above are incorporated herein by reference.

FIELD

The present disclosure relates to electrical conductors and more particularly to devices that electrically connect shielded cables to motor housings.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Variable speed drives (VSDs) can also be referred to as adjustable speed drives (ASDs), variable frequency drives (VFDs), and inverters. VSDs may include insulated gate bipolar transistors (IGBTs) due to their lower switching losses, smaller package sizes, and lower cost than other types of switching devices.

VSDs can power various different types of electrical loads. VSDs are used in various different types of industries, such as automotive, food and beverage, mining, energy, theater, automatic car washes, heating ventilation and air conditioning (HVAC), and other industries.

SUMMARY

In a feature, a terminator device is configured to electrically connect a shield of a shield cable connected to a motor drive to an electrically conductive motor housing of an electric motor. The terminator device includes: an electrically conductive housing; a shield connector configured to electrically connect (a) the shield of the shielded cable that is connected to the motor drive to (b) the electrically conductive housing; a housing conductor that is electrically conductive and that includes: a first end that is directly connected to the electrically conductive housing; and a second end configured to be directly connected to the electrically conductive motor housing of the electric motor.

In further features, conductor connectors are disposed within the electrically conductive housing and configured to electrically connect first insulated electrical conductors of the shielded cable with second insulated electrical conductors of a non-shielded cable connected to stator windings of the electric motor, respectively.

In further features, the conductor connectors include terminal blocks.

In further features, a DIN rail is mounted within the electrically conductive housing, where the terminal blocks are configured to engage the DIN rail.

In further features, a system includes the terminator device, the electric motor, the shielded cable, and the non-shielded cable.

In further features, the electric motor has an ingress protection (IP) rating of IP65 or higher.

In further features, the housing conductor is a flat braid cable.

In further features, a first end of the housing conductor is electrically connected to the electrically conductive housing and a second end of the housing conductor is configured to be electrically connected to the electrically conductive motor housing.

In further features, cable clamps are configured to clamp, to the terminator device, the shielded cable and a non-shielded cable connected to stator windings of the electric motor.

In further features, the shield connector is an electrically conductive and directly contacts both (a) the shield of the shielded cable and (b) the electrically conductive housing.

In further features, a fastener is configured to fasten and electrically connect the shield of the shielded cable to the electrically conductive housing.

In further features, the electrically conductive housing is configured to be fastened to a junction box of the electric motor.

In a feature, a system includes: a motor drive; an electric motor; a terminator device; a shielded cable having first insulated conductors and a shield that surrounds the first insulated conductors, where the first insulated conductors and the shield are electrically connected at first ends to the motor drive, where the first insulated conductors are connected at second ends to conductor connectors within the terminator device, and where the shield is electrically connected to an electrically conductive housing conductor of the terminator device; and a non-shielded cable having second insulated conductors and hot having a shield that surrounds the second insulated conductors, where the second insulated conductors are electrically connected at first ends to stator windings of the electric motor, where the second insulated conductors are connected at second ends to the conductor connectors within the terminator device, respectively, and the electrically conductive housing conductor of the terminator device is electrically connected to an electrically conductive motor housing of the electric motor.

In further features, the electric motor has an ingress protection (IP) rating of IP65 or higher.

In further features, the terminator device includes an electrically conductive housing that is electrically connected to the shield of the shielded cable and the electrically conductive housing conductor.

In further features, a fastener is configured to fasten the electrically conductive housing conductor to the electrically conductive motor housing of the electric motor.

In further features, the terminator device includes cable clamps configured to clamp, to the terminator device, the shielded cable and the non-shielded cable.

In further features, the electrically conductive housing conductor of the terminator device includes a flat braid shield.

In further features, the conductor connectors include terminal blocks.

In a feature, a terminator device is configured to electrically connect (a) a shield of a shield cable connected to a motor drive to (b) an electrically conductive motor housing of an electric motor. The terminator device includes: a housing; a housing conductor that is electrically conductive; and a shield connector configured to electrically connect (a)

the shield of the shielded cable that is connected to the motor drive to (b) the housing conductor, where the housing conductor includes: a first end that is electrically connected to the shield via the shield connector; and a second end configured to be directly connected to the electrically conductive motor housing of the electric motor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
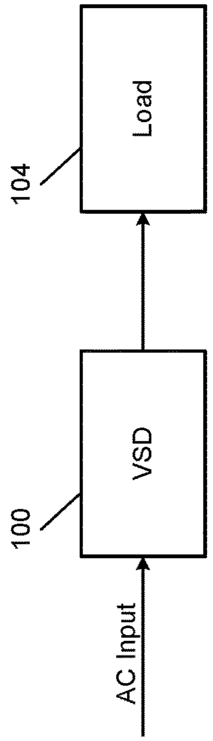
FIG. 1 is a functional block diagram of a variable speed drive (VSD) powering a load.

Variable speed drives can be used to control speed and torque of an electric motor. VSDs may include semiconductors that use insulated gate bipolar transistors (IGBTs) that switch and control power output to the electric motor because IGBTs may allow for higher carrier and/or switching frequencies. Silicon carbon metal oxide semiconductor field effect transistors (MOSFETs) may also allow for higher carrier and/or switching frequencies. Higher carrier and/or switching frequencies may decrease current ripple and allow for better performance of torque in electric motors, such as at lower speeds and/or operating frequencies. This may increase process performance.

Higher carrier frequencies also reduce electric motor lamination noise and decrease motor sound production. Decreased sound production may be valuable in various different industries, such as theaters and hospitals. Higher carrier frequencies also allow for less harmonic heating in the motor, which results in increased motor longevity and reliability.

Faster switching IGBTs, however, may increase noise frequencies. Noise may increase as IGBT switching increases. The value of increasing the carrier frequency, which determines the repetition rate of these noise currents being coupled to ground, may be worse for installations that must break/cut and re-terminate any shielded output cables connected between an electric motor and a VSD. This high frequency current to ground may be referred to as common mode current.

The NFPA 79 standard, 2018 edition, mandates the use of shielded cable between VSDs and motors. Some installations require that the shielded cable be broken/cut and re-terminated between VSD and motor, for example, to shut off power to motor and/or perform maintenance on motors without having to shut off the VSDs. Some industries may not shut off power to main control panels (including VSDs) and communications to networked systems as they may lose production.

Installations may be incorrect to manage the high frequencies producing electrical noise. Noise may be worsened if the shielded cable is broken/cut and re-terminated with the high frequency common mode current (carried on the shield) is coupled to lower frequency 50/60 Hz circuits. Common mode current is a type of electrical noise that is induced on signals with respect to referenced ground. This is a source of noise that is coupled by conduction or radiation, and circuits and sensitive equipment are susceptible to the magnitude, frequency, and repetition rate (carrier) of common mode noise.

Motors used in some environments, such as motors used in vehicle car washes, may need to have at least a minimum ingress protection (IP) rating, such as at least a IP65 rating, IP66 rating, IP67 rating, IP68 rating, or a higher IP rating. IP ratings are defined by the international IEC standard 60529 of the International Electrotechnical Commission (IEC) of 2013. Motors having at least the minimum IP rating do not allow water (and other material) to enter the motors for at least predetermined periods, etc.

Motors having at least the minimum IP rating may have a junction box that holds an unshielded cable including wires or the wires themselves bonded in an epoxy to prevent water infiltration. In other words, a pigtail of wires or a non-shielded cable comes out of the motor for watertight connectivity. Wires of the shielded cable from the VSD may be connected to the wires of the motor within the junction box, and the junction box may be sealed from water infiltration using a junction box cover and a gasket.

The shield of the shielded cable from the VSD, however, will remain isolated from the motor. This may cause noise emission, decrease motor lifetime, and/or have one or more other effects. Noise emission may, for example, interfere with wireless communications, such as cellular communications, WiFi communications, Bluetooth communications, etc.

The present application involves a device configured to electrically connect the shield of the shielded cable from the VSD to an electrically conductive housing of the motor. For example, a housing of the device may be electrically conductive (e.g., aluminum). The shield of the shielded cable may be electrically connected (e.g., using a cable gland) to the (electrically conductive) housing. Another electrical conductor (e.g., a flat braid shield cable) may be connected at one end to the housing and at the other end to the electrically conductive housing of the motor. This may create an electrical connection between the shield of the shielded cable and the motor and minimize noise emissions and isolates common mode current from getting back to a power source (e.g., a 60 Hertz alternating current power source).

FIG. 1 is a functional block diagram of an example implementation including a variable speed drive (VSD) 100 powering a load 104. VSDs can also be referred to as adjustable speed drives (ASDs). While the example of a variable speed drive is discussed, the present application is also applicable to other types of drives, such as variable frequency drives (VFDs).

The VSD 100 receives alternating current (AC) input power, such as three phase AC input power. Based on the AC input power, the VSD 100 outputs power to the (electrical) load 104. For example, the VSD 100 may output three-phase AC power to the load 104. Other types of VSDs output direct current (DC) power to the load 104.

Figure 2:
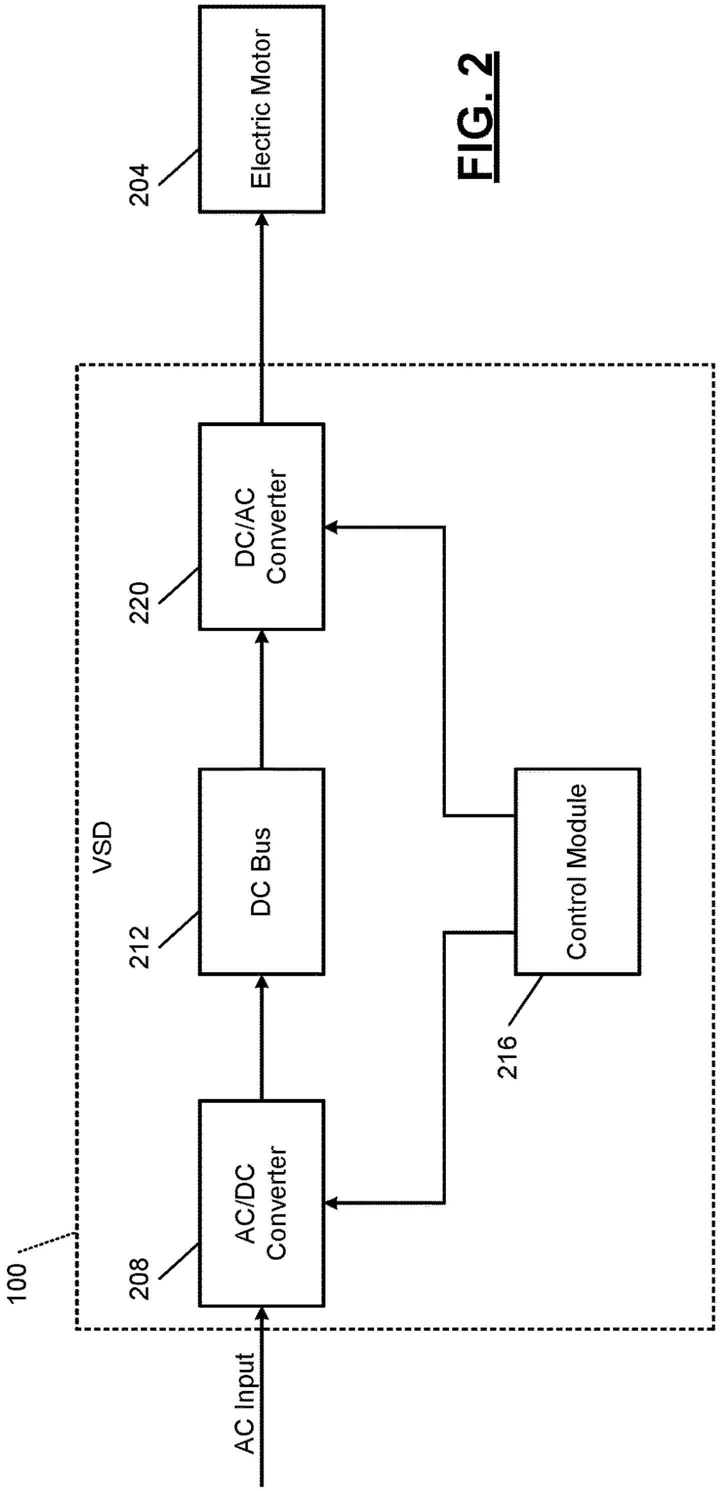
FIGS. 2-4 are functional block diagrams of example implementations of the VSD where the load is an electric motor.

FIG. 2 is a functional block diagram of an example implementation of the VSD 100 where the load 104 is an electric motor 204. While the example of the load 104 being the electric motor 204 will be discussed, the present application is also applicable to other types of loads.

The VSD 100 may include an AC/DC converter 208 that converts the AC input power to direct current (DC) power and outputs a DC voltage to a DC bus 212. The AC/DC converter 208 may be a passive AC/DC converter, such as a rectifier (e.g., full-wave). The DC voltage from the DC bus 212 is inverted from the output switching, for example of IGBTs, in a voltage pulse width modulated waveform that may appear sinusoidal with the current to the motor 204. In various implementations, the AC/DC converter 208 may be an active converter or include one or more active components, such as for a buck converter, a boost converter, or a combination buck/boost converter. In the example of the AC/DC converter 208 including one or more active components or being an active converter, a control module 216 may control switching of the AC/DC converter 208. The DC bus 212 may include, for example, one or more capacitors and/or one or more other components.

A DC/AC converter 220 converts DC power from the DC bus 212 into AC power and outputs the AC power to the electric motor 204. The DC/AC converter 220 may be, for example, an inverter (e.g., a three-phase inverter) or another suitable type of DC/AC converter. The control module 216 controls switching of the DC/AC converter 220 to control the AC power output to the electric motor 204, such as voltage, current, phase angle(s), and other characteristics of the AC power output.

Figure 3:
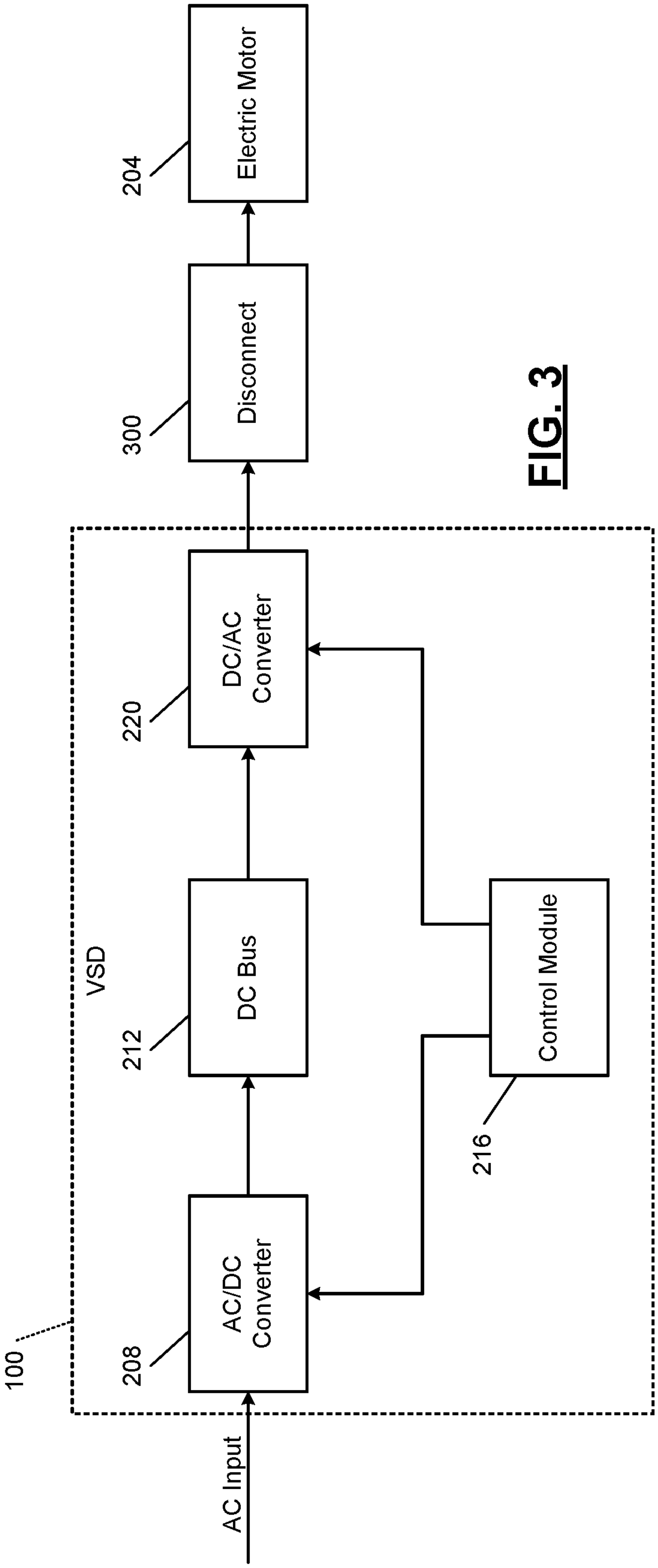

FIG. 3 is also a functional block diagram of the example implementation of the VSD 100 where the load 104 is the electric motor 204. As shown in FIG. 3, in various implementations, a disconnect 300 may be electrically connected between the VSD 100 and the electric motor 204. The disconnect 300 may be a manual disconnect or an automatic disconnect. The disconnect 300 electrically disconnects the electric motor 204 from the VSD 100 when the disconnect 300 is open. The disconnect 300 electrically connects the electric motor 204 with the VSD 100 when the disconnect 300 is closed. In addition to connecting and disconnecting the VSD 100 and the electric motor 204, the disconnect 300 may allow for one or more measurements to be taken (e.g., via a probe) between the VSD 100 and the electric motor 204.

Figure 4:
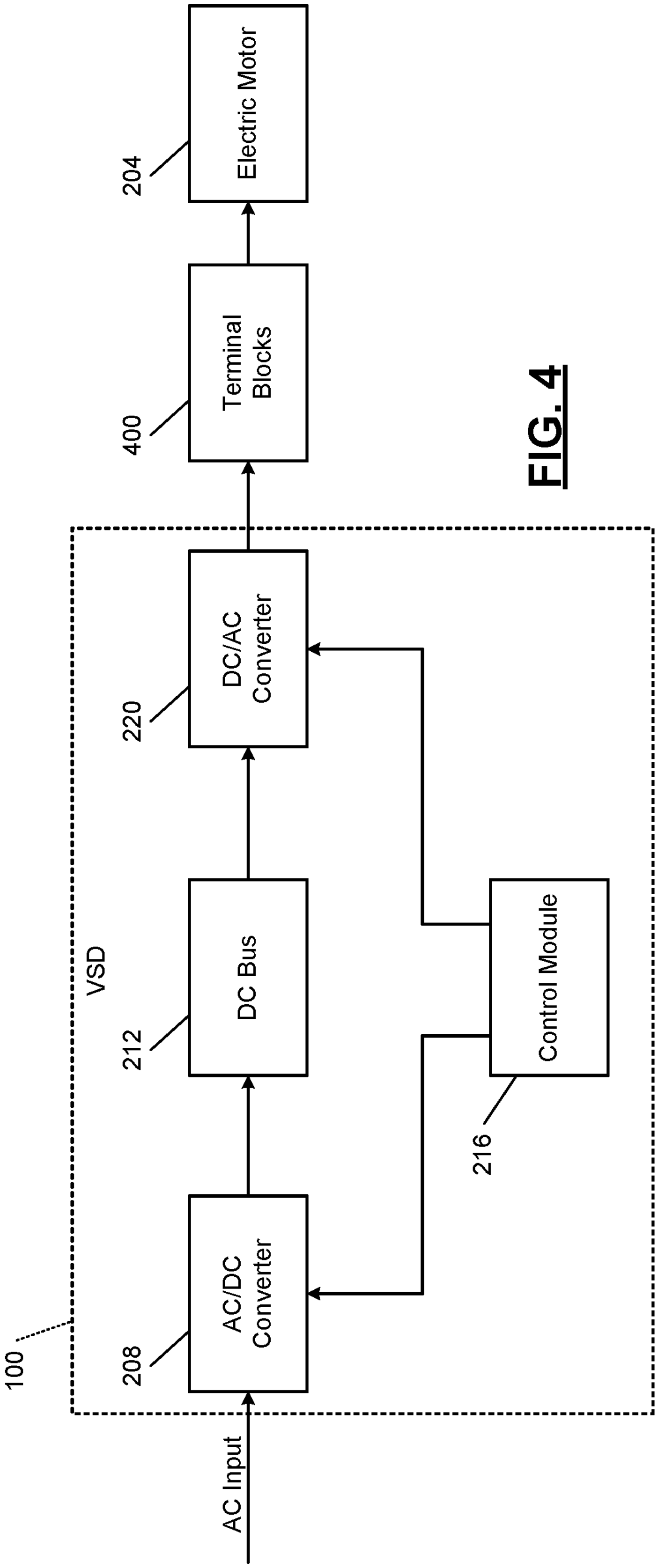

FIG. 4 is also a functional block diagram of the example implementation of the VSD 100 where the load 104 is the electric motor 204. As shown in FIG. 4, in various implementations, terminal blocks 400 may be electrically connected between the VSD 100 and the electric motor 204. The terminal blocks 400 may allow for one or more measurements to be taken (e.g., via a probe) between the VSD 100 and the electric motor 204.

Referring to FIGS. 3 and 4, the VSD 100 receives the AC input power by wire. The VSD 100 outputs power to the electric motor 204 by wire, such as via a shielded cable. The shielded cable may include cross-linked polyethylene (XLPE). The shielded cable may satisfy the National Fire and Protection Association (NFPA) 79 electrical standard for industrial machinery. The NFPA 79 standard may be the 2018 edition or a later edition. The shielded cable may include, for example, one or three symmetrical insulated ground conductors, three insulated reference conductors (e.g., U, V, W, or A, B, C), a drain wire (conductor), a shield (e.g., braided) that surrounds the ground and reference conductors, and an external insulator that surrounds the shield. In various implementations, more than one shielded cable may be connected per phase, for example, for higher horsepower electric motors. The shield may include, for example, a copper spiral, a tin copper braid with foil, and/or another suitable type of shield.

Figure 5:
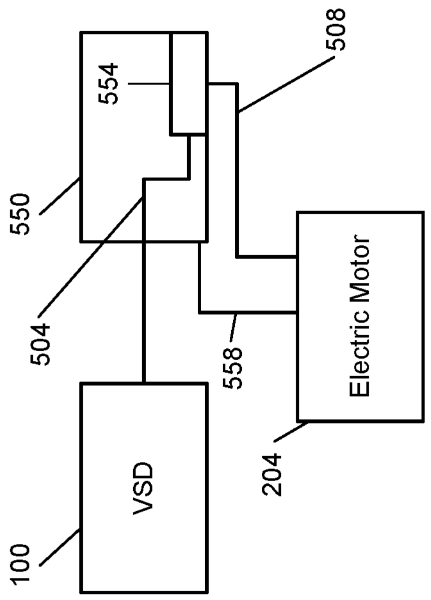
FIG. 5 includes a functional block diagram illustrative of an example connection of a VSD to an electric motor using a terminator device.

FIG. 5 includes a functional block diagram illustrative of the connection of the VSD to the electric motor 204 using a shield (motor) terminator device 550. A first length (portion) 504 of the shielded cable is electrically connected between respective output terminals of the VSD 100 and the terminator device 550. The shield of the first length 504 of shielded cable could be electrically connected to a shield of a second length (portion) 508 of cable connected to the stator of the electric motor 204. For example, the second length 508 of cable may include an insulated ground conductor and three insulated reference conductors (e.g., U, V, W, or A, B, C). The second length 508 may include an external insulator that surrounds the conductors. The second length 508 of cable, however, does not include a shield that surrounds the insulated ground conductor and the insulated reference conductors (e.g., radially inward of the external insulator).

The terminator device 550 may include terminal blocks 554. The terminal blocks 554 may be mounted on a DIN rail within the terminator device 550 in various implementations. The insulated ground conductors of the first and second lengths 504 and 508 may be electrically connected via one of the terminal blocks 554. The three insulated reference conductors of the first and second lengths 504 and 508 may be individually electrically connected via three of the terminal blocks 554, respectively.

As stated above, however, the second length 508 of cable does not include a shield. A housing of the electric motor 204 is electrically conductive. As discussed further below, the terminator device 550 includes an electrical conductor 558 and electrically connects the shield of the first length 504 of cable with the housing of the electric motor 204.

The terminator device 550 carries the high frequency current carried on the shields of the first length 504 of cable and isolates it from other components and other noise (e.g., low frequency noise).

Figure 6:
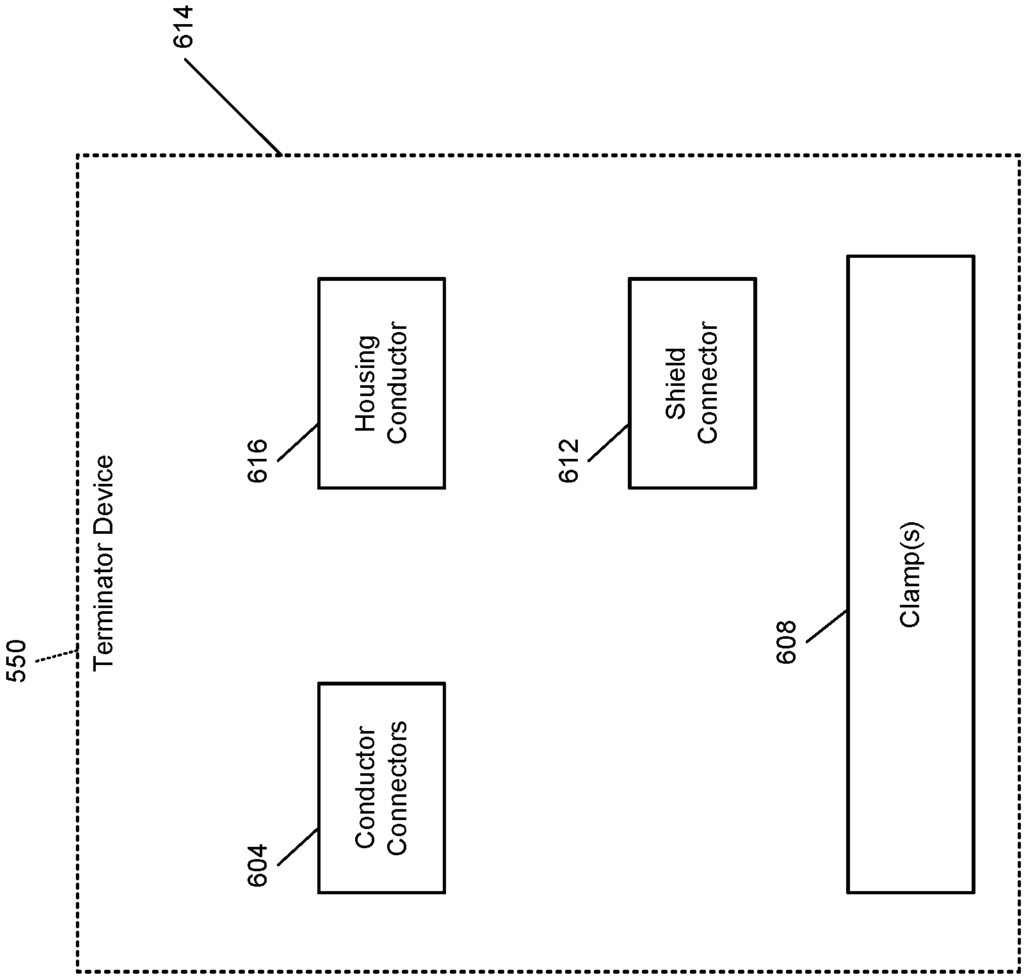
FIG. 6 includes a functional block diagram of an example implementation of a terminator device.

FIG. 6 includes a functional block diagram of an example implementation of the terminator device 550. The terminator device 550 includes a plurality of conductor connectors 604, such as terminal blocks, wire nuts, or another suitable type of electrical connector. The conductor connectors 604 electrically connect the insulated ground conductors and the insulated reference conductors.

The terminator device 550 also includes two or more clamps 608 (e.g., cable glands) that secure the first and second lengths 504 and 508 to the terminator device 550.

The clamps 608 may, for example, attach to exterior insulators of the lengths 504 and 508 of cable.

The terminator device 550 includes a shield connector 612 that electrically connects the shield of the first length 504 of cable to the terminator device 550. The shield connector 612 may be, for example, an electrically conductive (e.g., copper) cable gland or another suitable type of device that electrically connects to the shield of the first length 504 of cable.

The terminator device 550 includes a housing 614, such as an electrically conductive housing. The shield of the first length 504 of cable may be electrically connected to the housing (e.g., via the shield connector 612).

The terminator device 550 also includes a housing conductor 616 (e.g., a braided conductor) that is electrically conductive and is electrically connected at a first end to the shield of the first length 504 of cable (e.g., via the housing 614 and the shield connector 612) and at a second end to the housing of the electric motor 204.

The clamp(s) 608 may be used to grasp (clamp) the outer electrical insulator around one or more of the lengths of the shielded cable. The clamp(s) 608 may, for example, help prevent disconnection of the lengths of the shielded cable, for example, if weight is applied to the lengths of the shielded cable.

Figure 7:
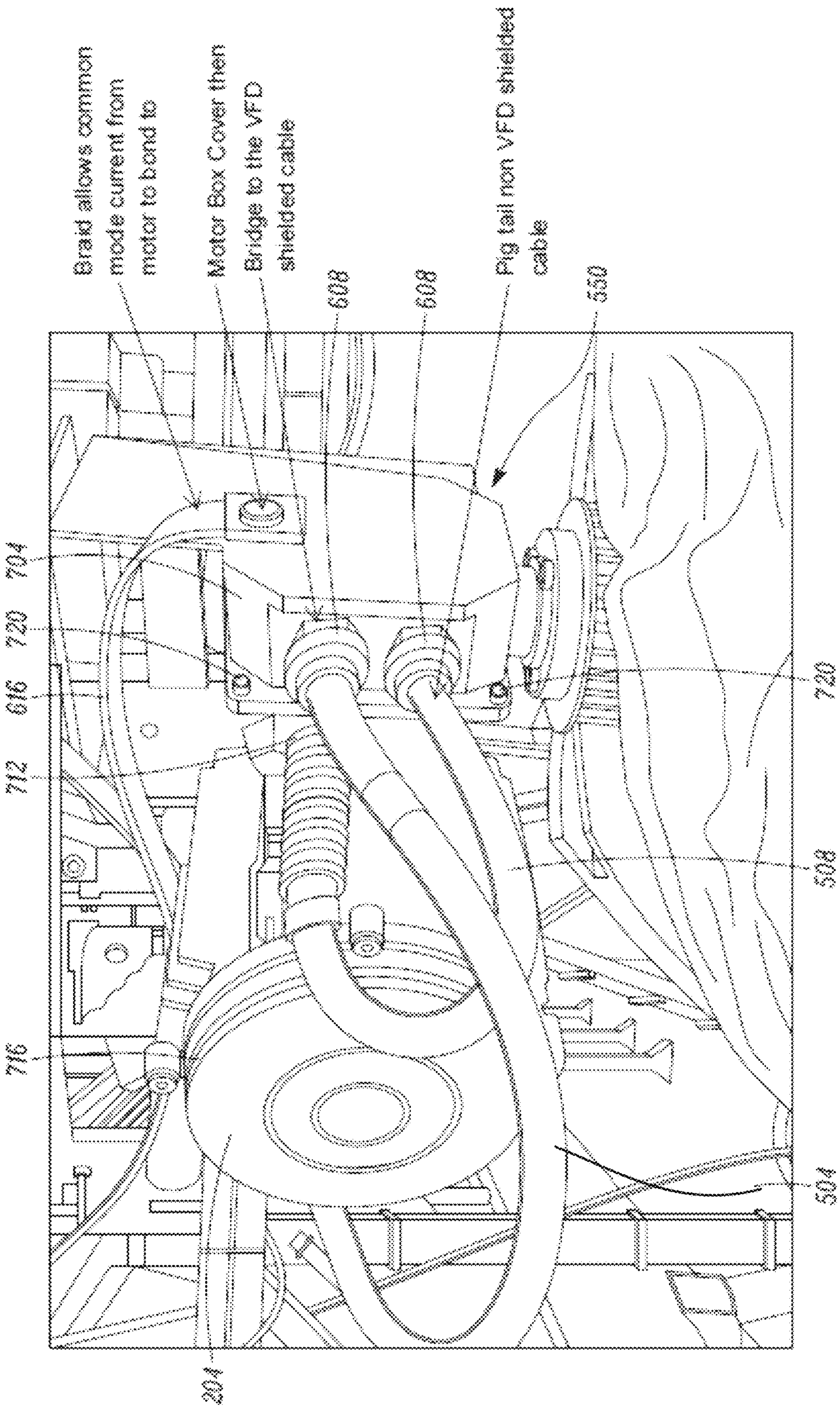
FIG. 7 is a perspective view including an example illustration of an electric motor and a terminator device.
Figure 8:
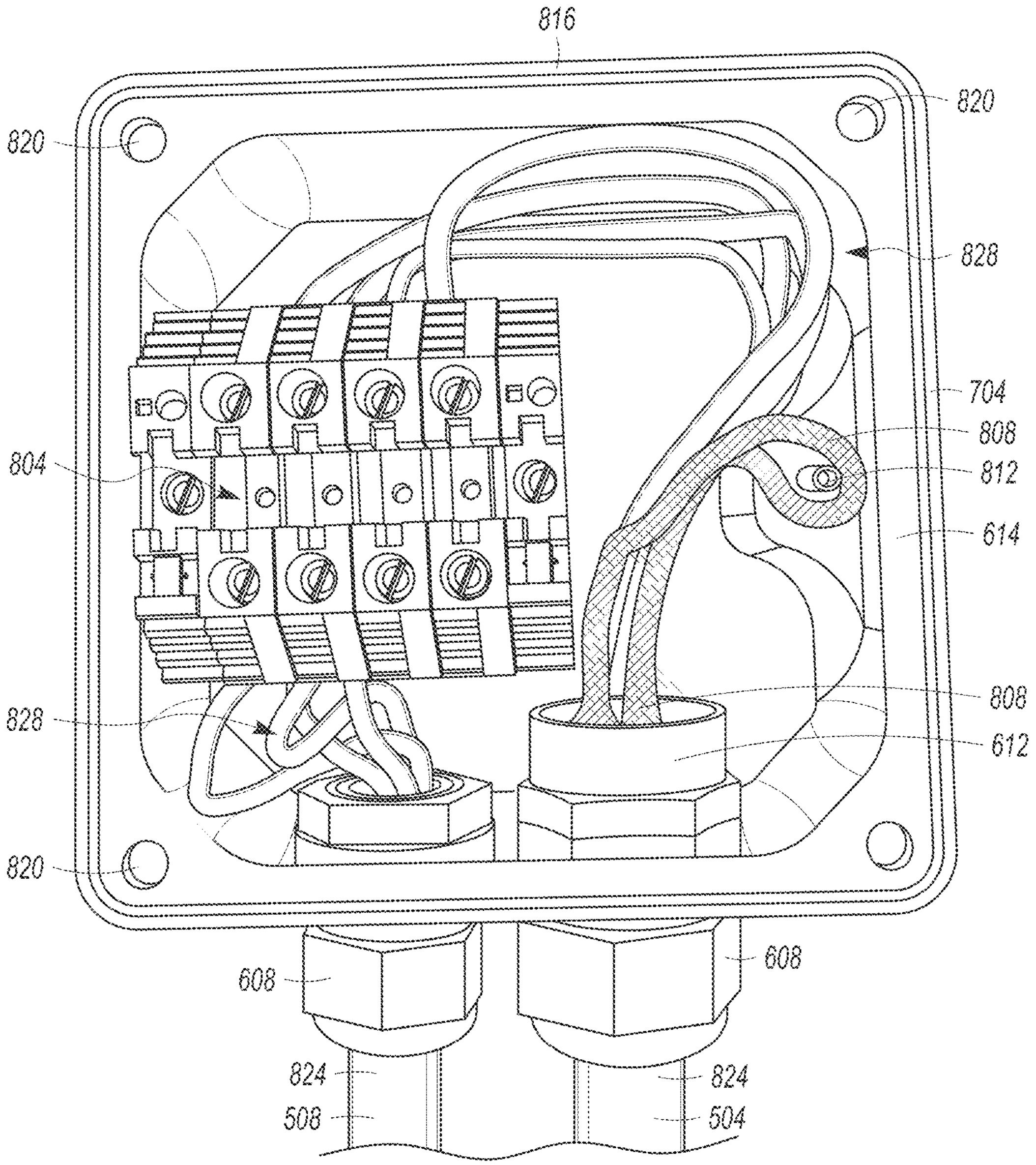
FIG. 8 is a perspective view of within the terminator device.
Figure 9:
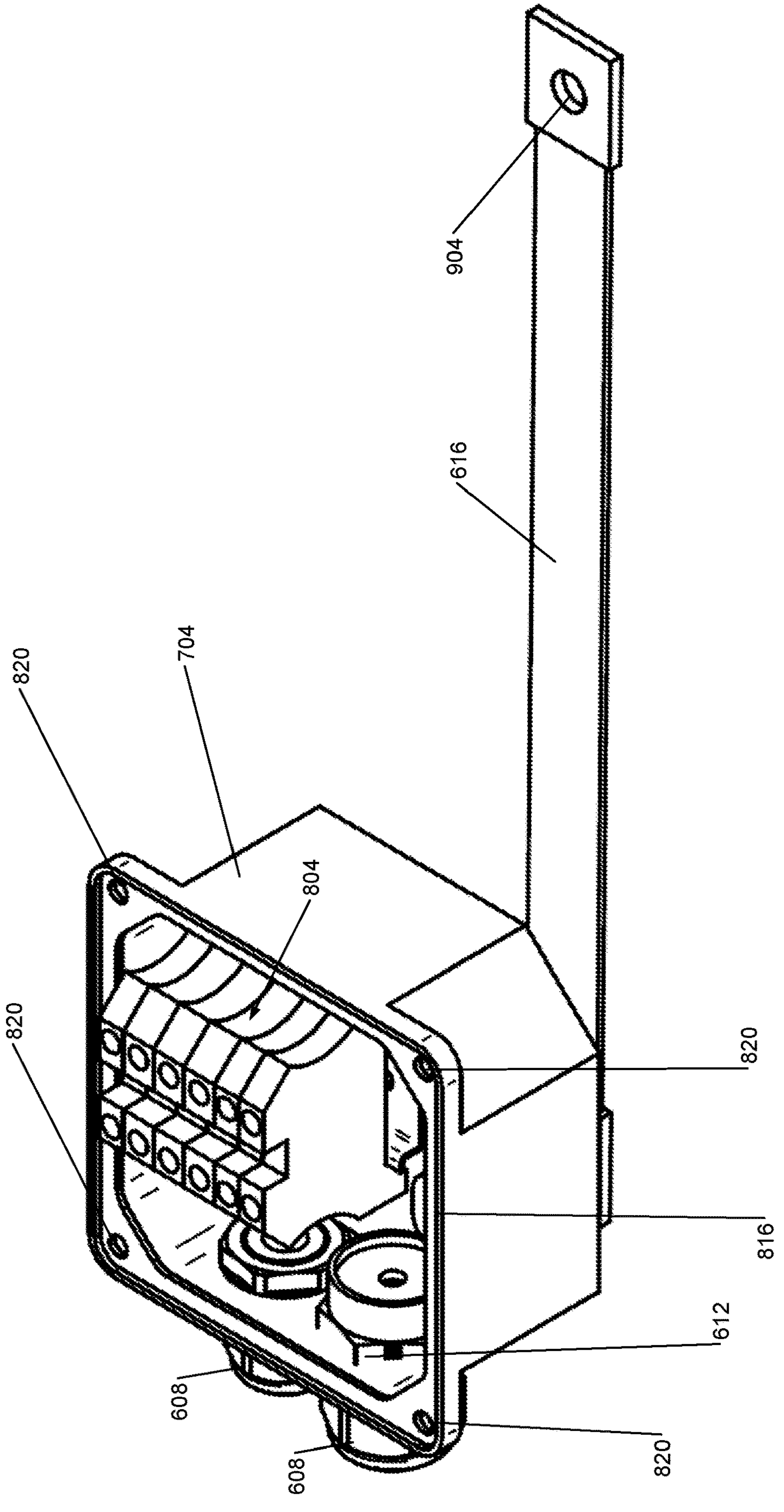
FIG. 9 is a right side perspective view of the terminator device.
Figure 10:
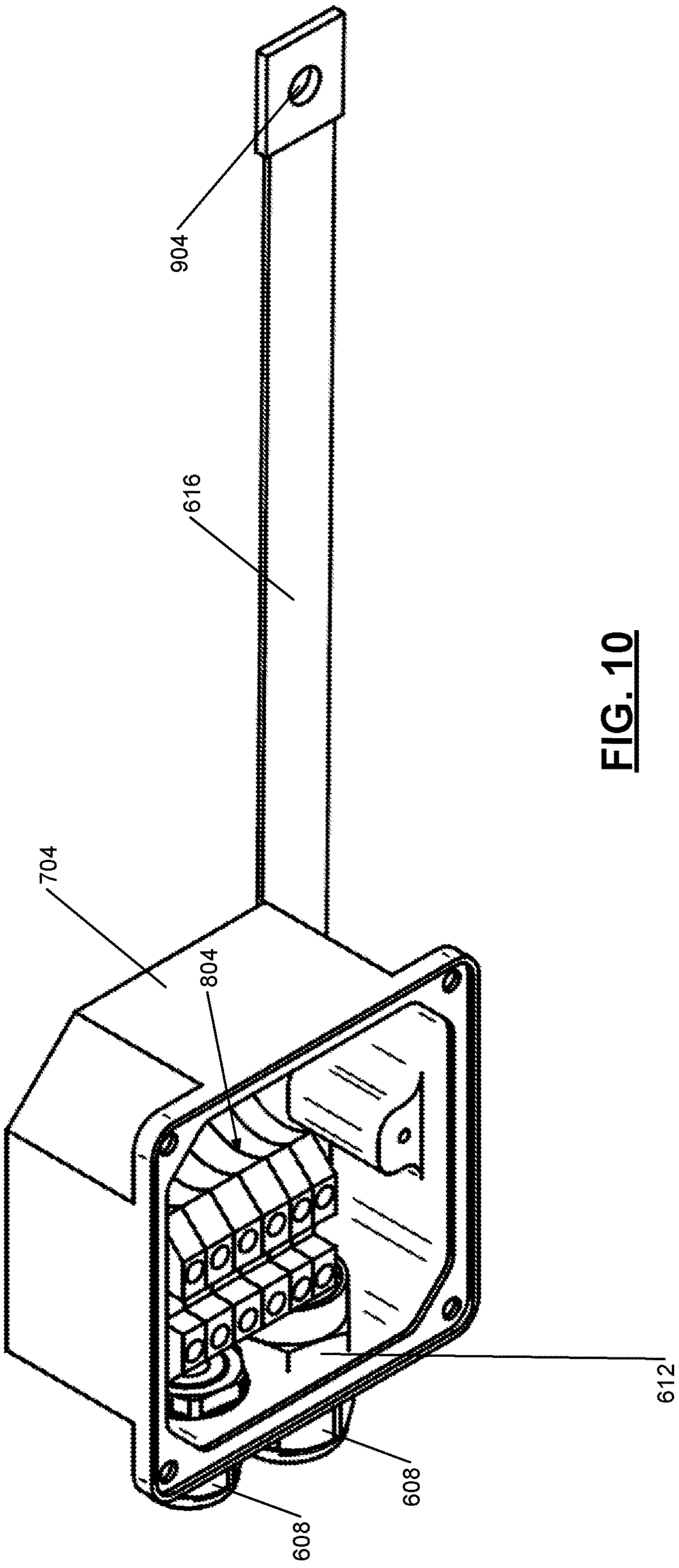
FIG. 10 is a left side perspective view of the terminator device.
Figure 11:
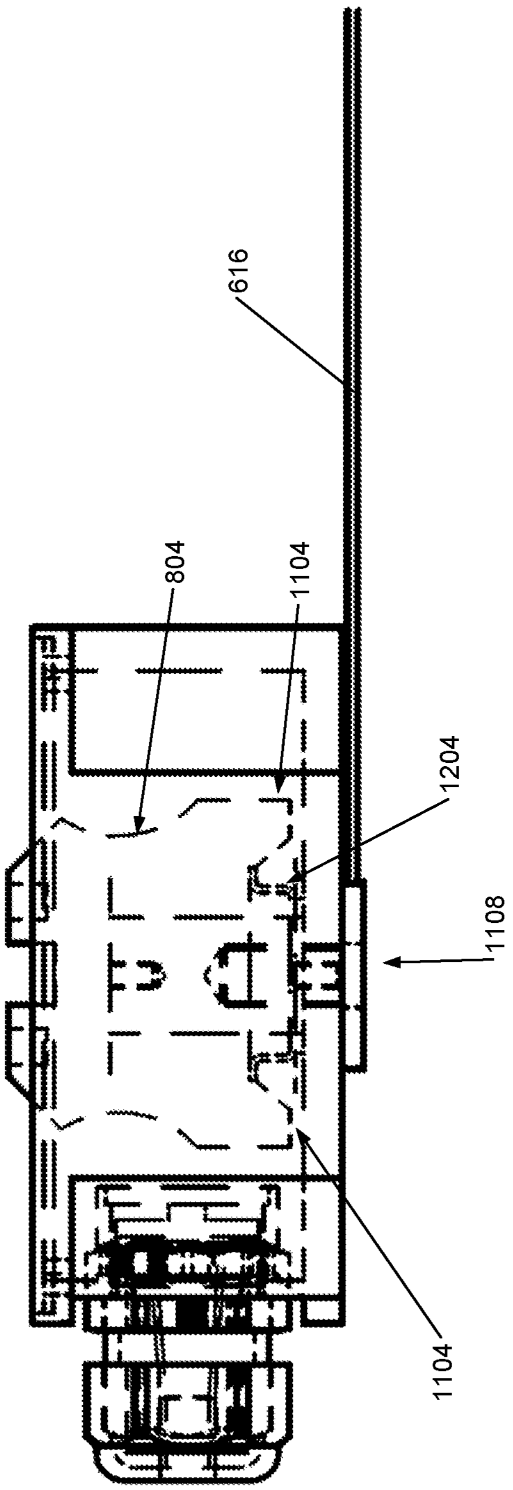
FIG. 11 is also a left side perspective view of the terminator device with internal features illustrated in dashed lines.
Figure 12:
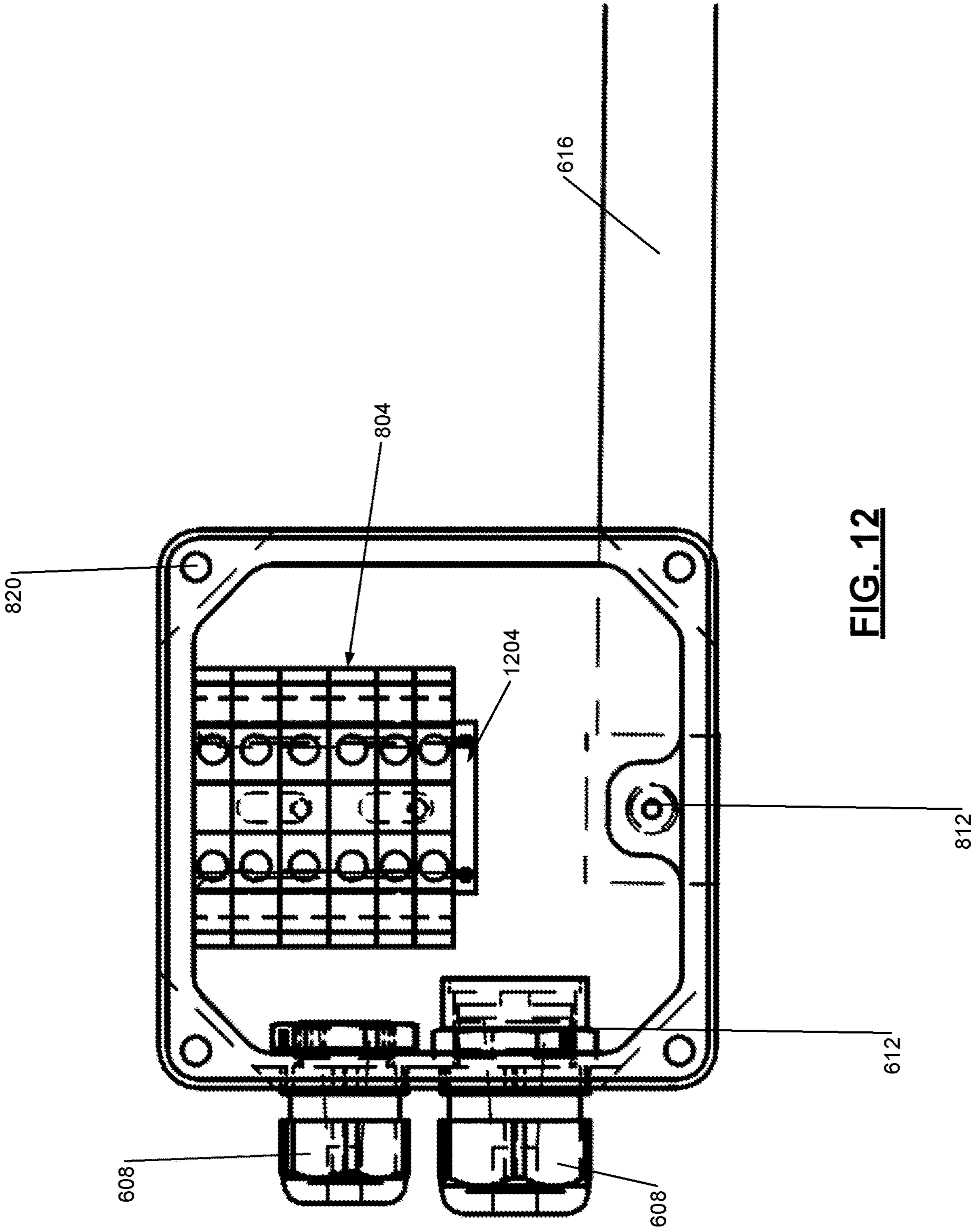
FIG. 12 is a perspective view similar to that of FIG. 8.
Figure 13:
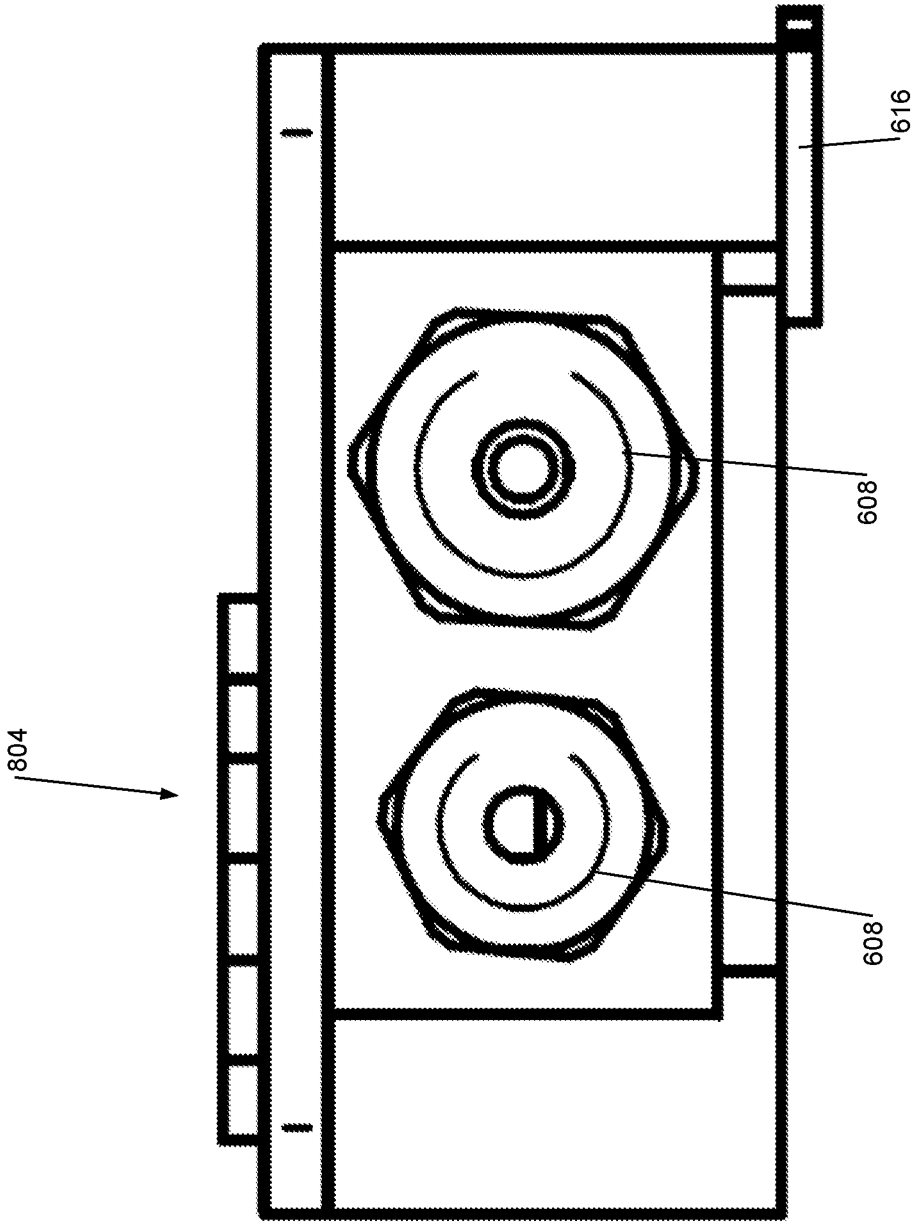
FIG. 13 is a perspective view of the terminator device facing the clamps of the terminator device.

FIG. 7 is a perspective view including an example illustration of the electric motor 204 and the terminator device 550. FIGS. 8-13 include perspective views of an example of the terminator device 550. More specifically, FIG. 8 is a perspective view of within the terminator device 550. FIG. 9 is a right side perspective view of the terminator device 550. FIG. 10 is a left side perspective view of the terminator device 550. FIG. 11 is also a left side perspective view of the terminator device 550 with internal features illustrated in dashed lines. FIG. 12 is a perspective view similar to that of FIG. 8. FIG. 13 is a perspective view toward the clamps 608.

Referring to FIGS. 7-13, the terminator device 550 includes the clamps 608. The clamps 608 may be watertight clamps (e.g., cable glands).

The housing 614 may include a junction box 704. The junction box 704 may be made of aluminum, copper, steel, or another type of electrically conductive material. A seal (e.g., rubber) may be disposed between the junction box 704 and a motor junction box 712 to prevent or minimize water entry into the junction boxes 704 and 712. The junction boxes 704 and 712 may be, for example, a 4 inch square junction box. While the example of a 4 inch square junction box is provided, the present application is applicable to other sizes and shapes of junction boxes. The junction box 704 may have the same size and shape as the motor junction box 712.

The conductors of the first and second lengths 504 and 508 are respectively electrically connected within the junction box 704. The second length 508 of cable may extend into to the terminator device 550 and out of the motor junction box 712. The second length 508 of cable may extend into the motor junction box 712 through an aperture in a housing 716 of the electric motor 204. The housing 716 is electrically conductive, such as made of aluminum, copper, steel, or another suitable type of electrically conductive material. The aperture in the housing 716 may be sealed, such as using an epoxy, to minimize or prevent water entry into the housing 716. The electric motor 204 may have an IP rating of IP 65 or higher.

The junction box 704 may be fastened to the motor junction box 712 via fasteners 720, such as screws or bolts. A seal may be sandwiched between the junction box 704 and the motor junction box 712 to prevent or minimize water entry into the motor junction box 712 or the junction box 704.

FIG. 8 includes an interior view of the junction box 704. As illustrated, terminal blocks 804 can be disposed within the junction box 704 and used to electrically connect the conductors of the first and second lengths 504 and 508, respectively. The terminal blocks 804 may be connected to a DIN rail 1204, such as illustrated in FIG. 12. The DIN rail 1204 may be, for example, a 15 millimeter (mm) DIN rail, a 35 mm DIN rail, or another suitable type of DIN rail. The DIN rail 1204 may be fixed (e.g., via one or more fasteners) or not fixed within the junction box 704.

An example of the shield connector 612 is illustrated in FIG. 8. The shield connector 612 may encircle the shield of the first length 504 of cable (e.g., 360 degrees) and directly contact the shield. The shield connector 612 may also directly contact the electrically conductive junction box 704.

As illustrated in FIG. 8, the shield may also be electrically connected to the electrically conductive junction box 704 via a bond fastener 812, such as a screw or a bolt. The bond fastener 812 may also fasten a first end of the housing conductor 616 to the junction box 704, such as illustrated in FIG. 12. In the example of the junction box 704 being electrically insulative (isolative), the bond fastener 812 may electrically connect the shield to the housing conductor 616.

As shown in FIG. 8 the junction box 704 may include a flange 816 formed around an outer edge of the junction box 704. The seal may be disposed inwardly of the flange 816 and compressed between the junction boxes 704 and 712 via the fasteners 720. The junction box 704 may include fastener apertures 820 through which the fasteners 720 may extend to fasten the junction box 712 to the motor junction box 712. The fastener apertures 820 may be threaded or non-threaded. In various implementations, apertures in the motor junction box 712 may be threaded.

The terminal blocks 804 allow the respective electrical conductors to be electrically connected to each other. The terminal blocks 804 also electrically isolate the electrical conductors from the junction box 704. The terminal blocks 804 have one or more features 1104 configured to hold the terminal blocks 804 to the DIN rail 1204. The terminal blocks 804 are also releasable from the DIN rail 1204, such as manually by prying one end of the terminal blocks 804 away from the Din rail 1204.

The DIN rail 1204 may be fixed to the junction box 704 via one or more fasteners, such as bolts 1108. In various implementations, the DIN rail 1204 may be fixed to the junction box 704 in another suitable manner, such as via an adhesive or via one or more other types of fasteners.

The shield connector 612 may be configured to electrically contact (and directly contact) as much of the 360 degree surface area of the shield portion (once exposed) of the first length 504 of the shielded cable as possible. The shield connector 612 may electrically contact at least 180 degrees of a circumference of the shield portion, at least 210 degrees of the circumference, at least 240 degrees of the circumference, at least 270 degrees of the circumference, or at least 300 degrees of the circumference. The shield connector 612 may be, for example, metal cable clamps, such as EMC shield clamps by Icotek or another suitable type of electrically conductive shield clamp.

As shown in FIG. 8, the (outer) insulators 824 is stripped from ends of the first and second lengths 504 and 508 of the cable. This exposes the shield 808 of the first length 504 and the electrical conductors of the first and second lengths 504 and 508 of cable. The shield 808 and the outer insulators 824 encircle insulated conductors 828 (the reference conductors and the ground conductor) of the first and second lengths 504 and 508 of the cable. Ends of the insulated conductors 828 are stripped of the insulation and connected to the terminal blocks 804, respectively.

Figure 14:
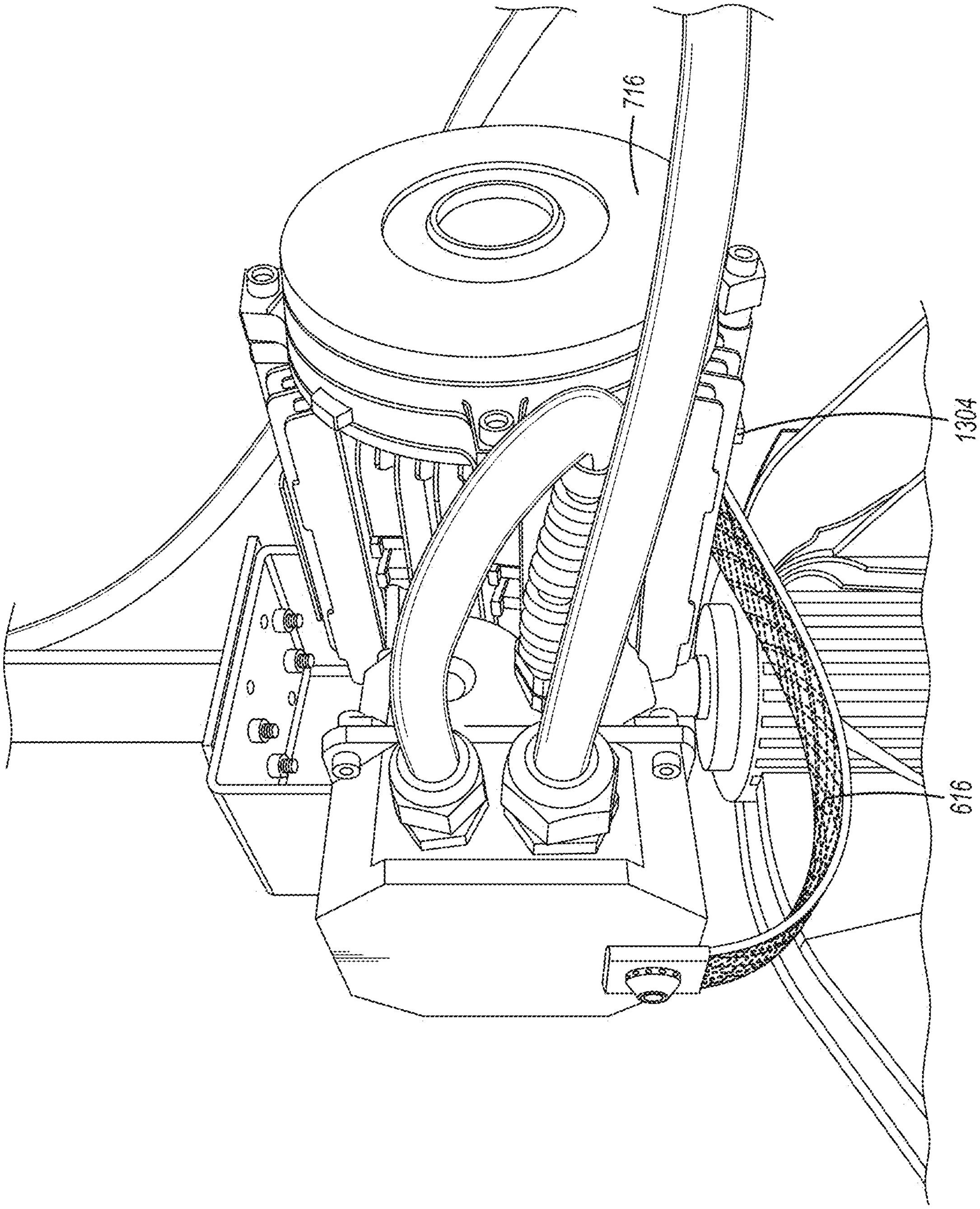
FIGS. 14 and 15 include perspective view illustrative of the terminator device fastened to the housing of a motor.
Figure 15:
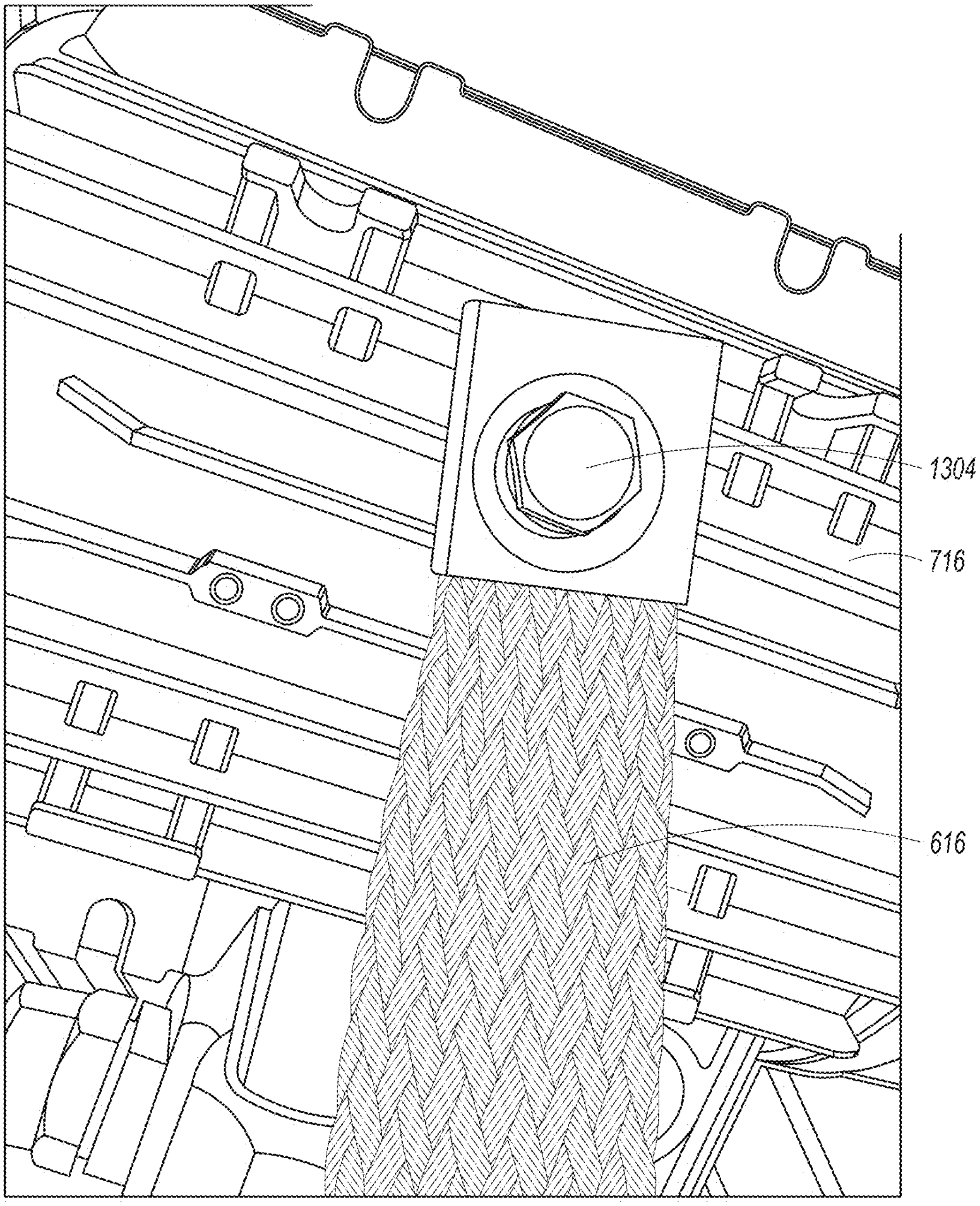

A housing conductor 616 may include a flat braid conductor (e.g., by Alpha Wire), a tin copper conductor, or another suitable type of conductor configured to provide a target skin effect and surface area to carry the common mode current. The housing conductor 616 is not shown in the example of FIG. 8 for simplicity. A second end of the housing conductor 616 may include a fastener aperture 904, such as shown in FIGS. 9 and 10. A fastener 1304 such as a bolt or screw can extend through the fastener aperture 904 and fasten the housing conductor 616 to the housing 716 of the electric motor 204, such as illustrated in FIGS. 14 and 15. The fastener and/or the direct contact between the housing conductor 616 and the housing 716 electrically connects the housing conductor 616 to the housing 716. In the above manner, the shield of the first length 504 of cable is electrically connected to the housing 716 of the electric motor 204 via the terminator device 550. In the example shown, the shield is electrically connected to the housing 716 via the shield connector 612, the housing of the junction box 704, and the housing conductor 616.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) or power that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A terminator device configured to electrically connect (a) a shield of a shield cable connected to (b) an electrically conductive motor housing of an electric motor, the shield cable connected to a motor drive, the terminator device comprising:

an electrically conductive housing;

a shield connector configured to electrically connect (a) the shield of the shielded cable that is connected to the motor drive to (b) the electrically conductive housing;

a housing conductor that is electrically conductive and that includes:

a first end that is directly connected to the electrically conductive housing; and a second end configured to be directly connected to the electrically conductive motor housing of the electric motor.

2. The terminator device of claim 1 further comprising conductor connectors disposed within the electrically conductive housing and configured to electrically connect first insulated electrical conductors of the shielded cable with second insulated electrical conductors of a non-shielded cable connected to stator windings of the electric motor, respectively.

3. The terminator device of claim 2 wherein the conductor connectors include terminal blocks.

4. The terminator device of claim 3 further comprising a DIN rail mounted within the electrically conductive housing, wherein the terminal blocks are configured to engage the DIN rail.

5. A system comprising:

the terminator device of claim 2;

the electric motor;

the shielded cable; and the non-shielded cable.

6. The system of claim 5 wherein the electric motor has an ingress protection (IP) rating of IP65 or higher.

7. The terminator device of claim 1 wherein the housing conductor is a flat braid cable.

8. The terminator device of claim 1 wherein a first end of the housing conductor is electrically connected to the electrically conductive housing and a second end of the housing conductor is configured to be electrically connected to the electrically conductive motor housing.

9. The terminator device of claim 1 further comprising cable clamps configured to clamp, to the terminator device, the shielded cable and a non-shielded cable connected to stator windings of the electric motor.

10. The terminator device of claim 1 wherein the shield connector is an electrically conductive and directly contacts both (a) the shield of the shielded cable and (b) the electrically conductive housing.

11. The terminator device of claim 1 further comprising a fastener configured to fasten and electrically connect the shield of the shielded cable to the electrically conductive housing.

12. The terminator device of claim 1 wherein the electrically conductive housing is configured to be fastened to a junction box of the electric motor.

13. A system comprising:

a motor drive;

an electric motor;

a terminator device;

a shielded cable having first insulated conductors and a shield that surrounds the first insulated conductors, wherein the first insulated conductors and the shield are electrically connected at first ends to the motor drive, wherein the first insulated conductors are connected at second ends to conductor connectors within the terminator device, and wherein the shield is electrically connected to an electrically conductive housing conductor of the terminator device; and a non-shielded cable having second insulated conductors and not having a shield that surrounds the second insulated conductors, wherein the second insulated conductors are electrically connected at first ends to stator windings of the electric motor, wherein the second insulated conductors are connected at second ends to the conductor connectors within the terminator device, respectively, and the electrically conductive housing conductor of the terminator device is electrically connected to an electrically conductive motor housing of the electric motor.

14. The system of claim 13 wherein the electric motor has an ingress protection (IP) rating of IP65 or higher.

15. The system of claim 13 wherein the terminator device includes an electrically conductive housing that is electrically connected to the shield of the shielded cable and the electrically conductive housing conductor.

16. The system of claim 13 further comprising a fastener configured to fasten the electrically conductive housing conductor to the electrically conductive motor housing of the electric motor.

17. The system of claim 13 wherein the terminator device includes cable clamps configured to clamp, to the terminator device, the shielded cable and the non-shielded cable.

18. The system of claim 13 wherein the electrically conductive housing conductor of the terminator device includes a flat braid shield.

19. The system of claim 13 wherein the conductor connectors include terminal blocks.

20. A terminator device configured to electrically connect (a) a shield of a shield cable to (b) an electrically conductive motor housing of an electric motor, the shielded cable connected to a motor drive, the terminator device comprising:

a housing;

a housing conductor that is electrically conductive; and a shield connector configured to electrically connect (a) the shield of the shielded cable that is connected to the motor drive to (b) the housing conductor, wherein the housing conductor includes:

a first end that is electrically connected to the shield via the shield connector; and a second end configured to be directly connected to the electrically conductive motor housing of the electric motor.

* * * * *